Sept. 12, 1933.  H. A. PALMER  1,926,400
APPARATUS FOR FORMING RIM MEMBERS
Filed Feb. 3, 1932   3 Sheets-Sheet 2

INVENTOR
Harry A. Palmer

ATTORNEYS

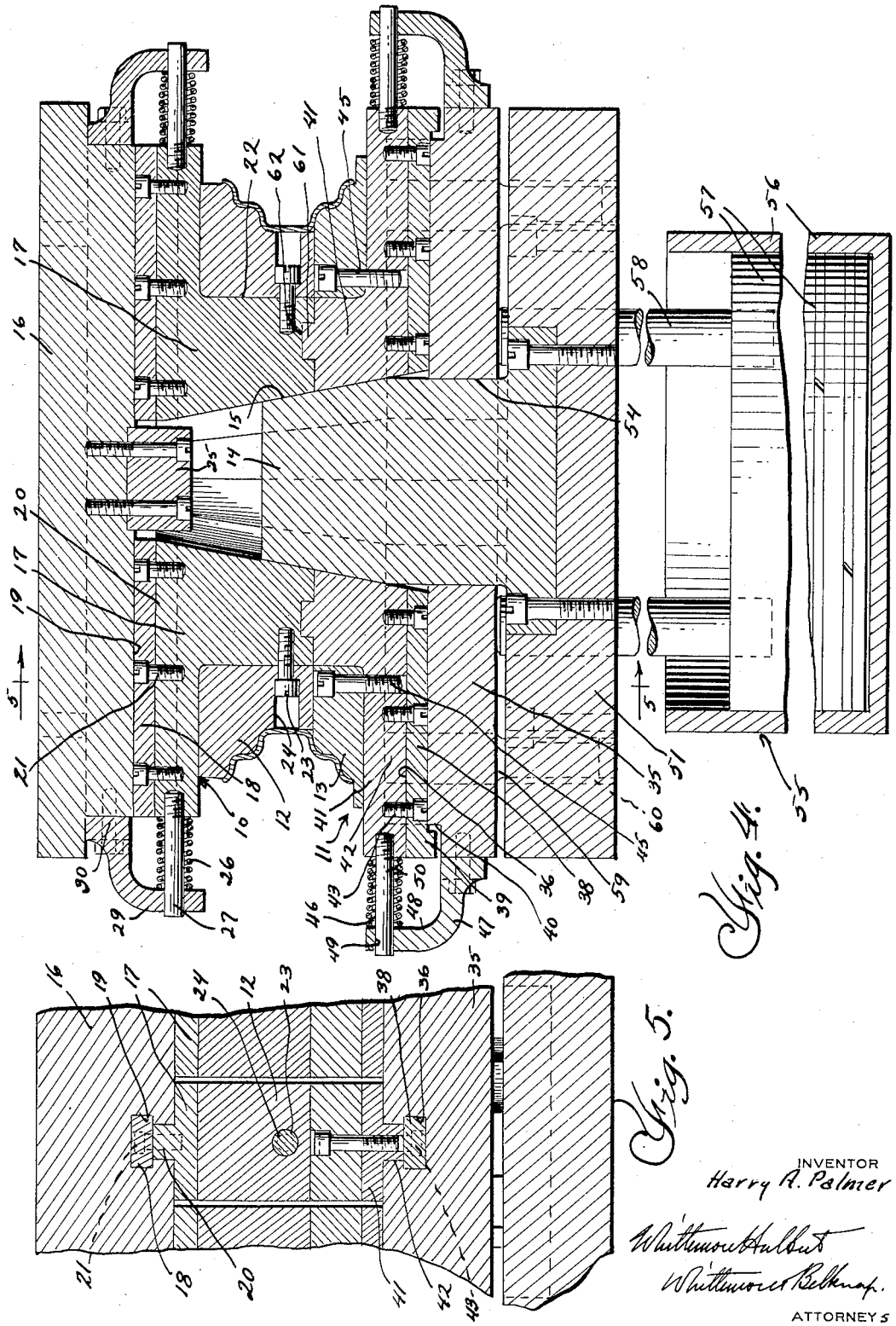

Patented Sept. 12, 1933

1,926,400

UNITED STATES PATENT OFFICE 1,926,400

APPARATUS FOR FORMING RIM MEMBERS

Harry A. Palmer, Jackson, Mich., assignor to Kelsey-Hayes Wheel Corporation, Detroit, Mich., a corporation of New York Application February 3, 1932. Serial No. 590,734

12 Claims. (Cl. 153—35)

This invention relates generally to apparatus for use in the manufacture of rim members and has particular reference to an expanding fixture for sizing vehicle wheel tire carrying rims.

Although the present invention may be employed for expanding various types and sizes of vehicle wheel rims, nevertheless, it finds particular utility for use in expanding rims of the drop center type.

In the manufacture of vehicle drop center rims as now commercially produced, expanding fixtures are usually provided having radially movable sizing jaws cooperating in their innermost positions to form an annular peripheral surface corresponding to the cross sectional contour of the rim to be fashioned and having a diameter substantially less than the smallest diameter of the rim so as to permit placing the rim over the jaws prior to the sizing operation. The jaws are then moved from their innermost positions aforesaid radially outwardly into engagement with the rim to size the same and to supposedly impart a true circular contour to the rim. However, considerable difficulty has heretofore been experienced in forming channeled or drop center rims to a true circular contour due to the relatively great differences between the internal and external diameters of the rims which necessitates a relatively long travel of the jaws from the innermost positions aforesaid thereof to their outer or rim engaging positions. Inasmuch as the jaws move radially of the rims, it will be apparent that when the same assume their outer positions in engagement with the rims, the peripheral portions thereof will be circumferentially spaced from each other a distance depending upon the radial travel of the jaws necessary to bring the latter in engagement with the rims. It will be observed from the foregoing that in sizing relatively deep channeled rims, substantial portions of the latter between the jaws will not be engaged by the latter resulting in alternating flat and curved portions throughout the circumference of the finished rims. The lengths of the flat portions aforesaid are obviously more pronounced in the deeper channeled rims owing to the greater travel of the sizing jaws necessary to engage the same with the rims and these flats are extremely objectionable since they materially distract from the commercial practicability of the rims, often times necessitating tedious hand operations to remove the same which not only increases the cost of manufacture, but appreciably retards production.

The present invention contemplates a decided improvement in the manufacture of drop center rims by providing a rim sizing apparatus capable of expanding rims to a predetermined size while at the same time insuring forming these rims perfectly round for all practical purposes irrespective of the differences in diameter of the internal and external portions thereof.

Another object of the present invention which contributes materially in securing the foregoing advantageous results resides in the provision of rim sizing apparatus having radially movable expanding jaws formed of sections mounted for relatively movement toward and away from each other to permit extending the same into the rims from opposite sides of the latter and cooperating, when moved into engagement with each other in the rims, to form the expanding jaws aforesaid. By providing an arrangement of the foregoing character, the necessary radial travel of the jaws to perform the sizing function is reduced to the minimum and corresponds substantially to the actual degree of expansion of the rim during the sizing operation with the result that the circumferential space between adjacent jaws is correspondingly reduced.

A further object of the present invention resides in the novel and expedient manner in which the expanding apparatus may be altered to compensate for rims of various sizes and cross sectional contours.

A still further advantageous feature of the present invention is attributed to the simplicity of the apparatus and the novel manner in which the same functions to perform the desired results. This latter feature as well as the foregoing objects will be made more apparent as this description proceeds, especially when considered in connection with the accompanying drawings, wherein:

Figure 4 is a view similar to Figure 1 showing the parts in a different position;

Figure 5 is a sectional view taken on the line 5—5 of Figure 4.

Figure 1:
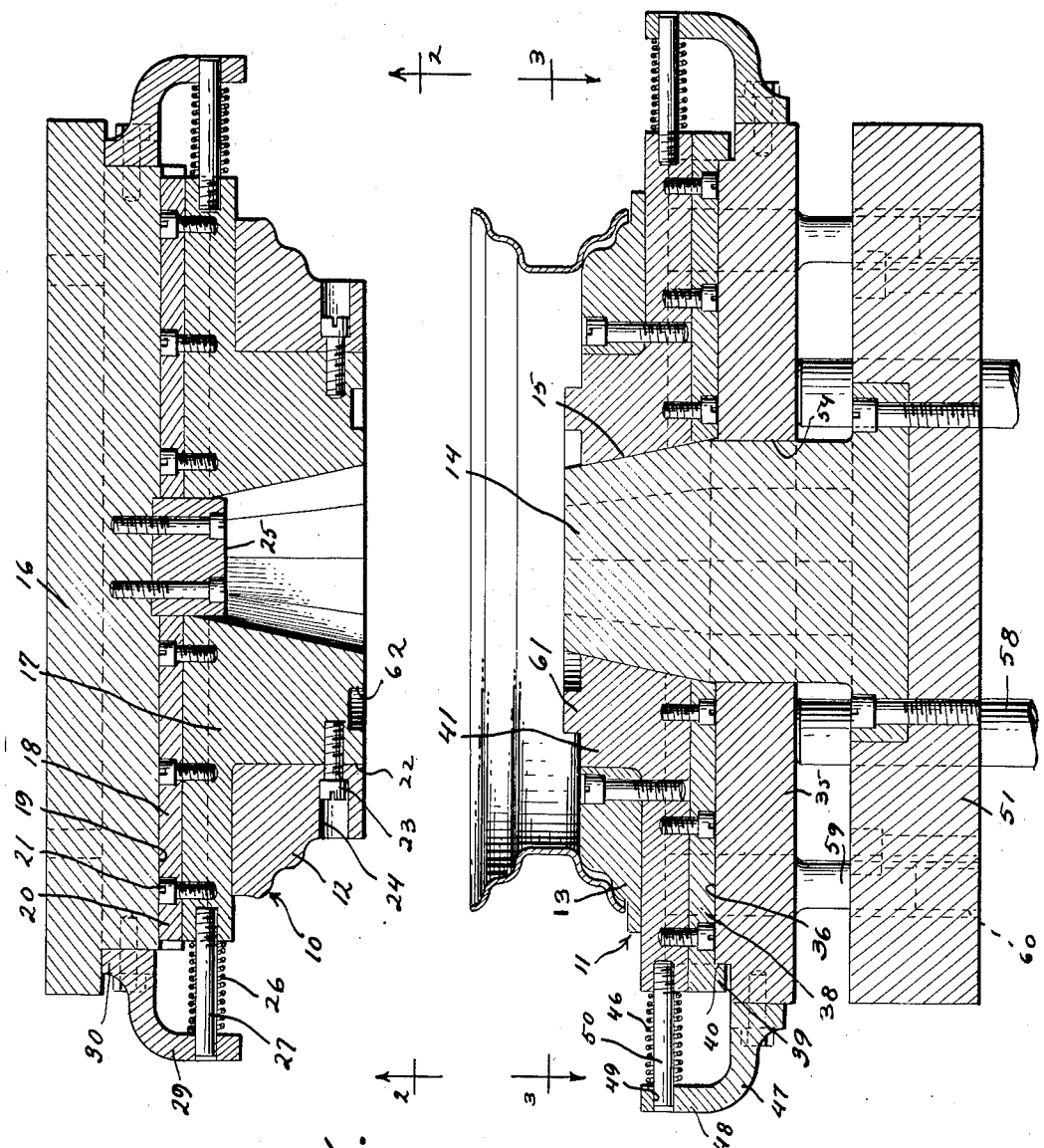
Figure 1 is a vertical section through a machine constructed in accordance with this invention.
Figure 2:
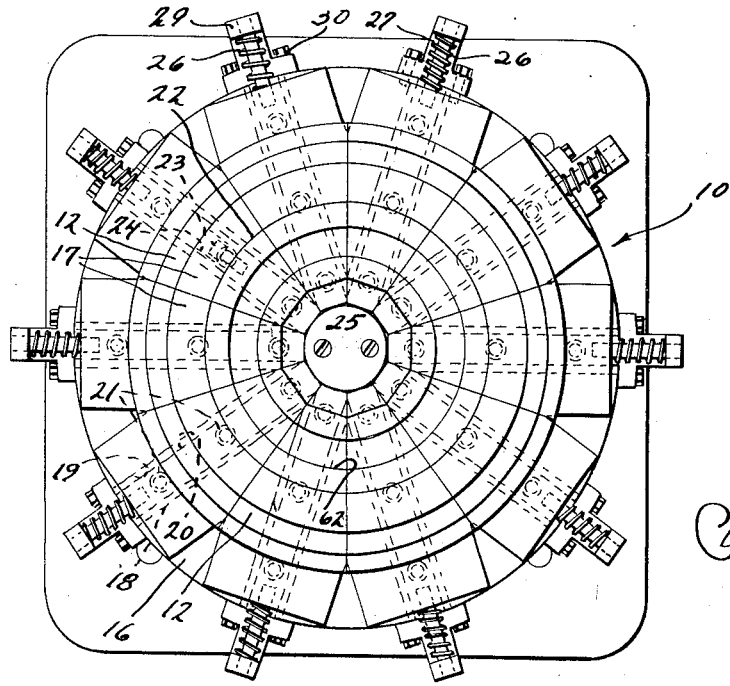
Figure 2 is a cross sectional view taken substantially on the line 2—2 of Figure 1.
Figure 3:
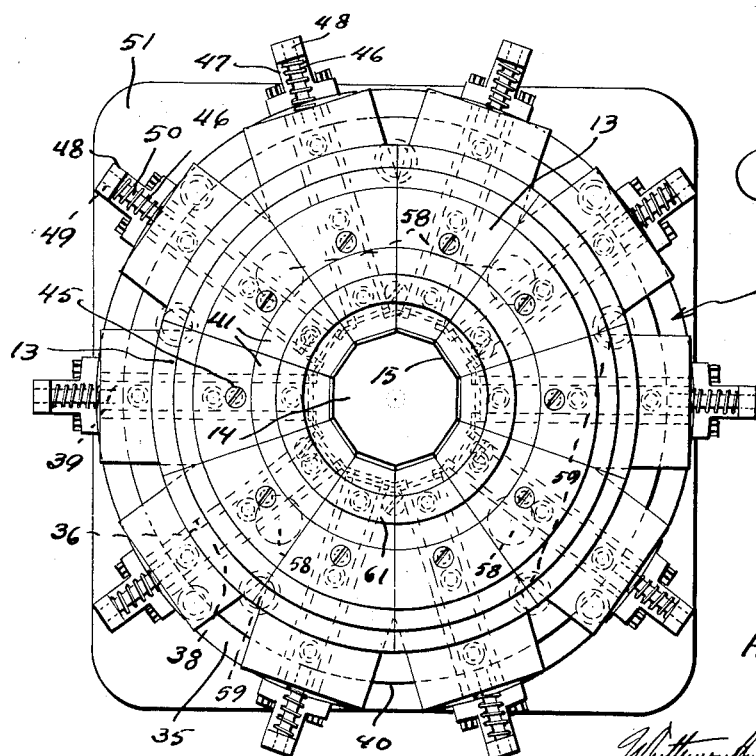
Figure 3 is a view similar to Figure 2 taken on the line 3—3 of Figure 1.

While as previously stated the apparatus to be presently described may be employed to advantage in expanding rims of various cross sectional contours and sizes, nevertheless, for the purpose of illustrating that the expanding fixture forming the subject matter of this invention definitely solves an existing problem in the manufacture of drop center rims, I have shown the same as employed in connection with this latter type of rim.

In general, the expanding fixture shown herein for the purpose of illustration comprises a pair of upper and lower jaw assemblies 10 and 11 mounted for movement relative to each other along a common vertical axis. The lower jaw assembly 11 is preferably supported upon air cushions as and for the purpose to be presently described, while the upper jaw assembly 10 may be suitably connected to a punch press (not shown) of any suitable design. Carried by the upper assembly 10 is a plurality of jaw sections 12 cooperating with corresponding jaw sections 13 fixed to the assembly 11 when in engagement with the latter sections to form jaws having peripheral surfaces corresponding in configuration to the cross sectional contour of the rim adapted to be fashioned. Both series of jaw sections 12 and 13 are preferably readily removably secured in place so as to permit expediently interchanging the same for sections of different sizes and configurations and thereby render it possible to utilize the apparatus for expanding different types and sizes of rims. Extending upwardly through the lower jaw assembly and positioned coaxially relative to the latter and upper jaw assembly 10 is an expanding cone 14 having a plurality of inwardly tapering side walls angularly arranged with respect to each other and corresponding in number to the number of sizing jaws. The expanding cone in the present instance is fixed relative to the upper and lower assemblies and functions upon movement of the latter downwardly as a unit relative thereto to engage the jaws and move the latter radially outwardly into engagement with the rim.

As will be more fully hereinafter described, the foregoing arrangement is such that initial downward movement of the upper assembly 10 by the punch press (not shown) causes the upper jaw sections 12 to move into engagement with the lower jaw sections 13 to form the sizing jaws. Continued downward movement of the upper assembly effects a corresponding downward movement of the lower assembly relative to the expanding cone whereupon movement of both assemblies downwardly relative to the expanding cone causes the tapered walls 15 of the latter to engage the jaw sections aforesaid and move the latter radially outwardly as a unit into engagement with the rim to size the same.

In detail, the upper assembly 10 comprises a holder 16 and a plurality of jaw carriers 17 mounted upon the lower surface of the holder 16 for sliding movement radially of the vertical axis of the holder. The jaw carriers 17 are secured to the holder by means of keys 18 slidably mounted in suitable radially extending T-shaped slots 19 in the lower surface of the holder. The keys 18 are slidably retained within the transverse portions of the slots 19 and the carriers 17 are provided with longitudinally extending ribs 20 on the upper surfaces thereof adapted to project through the vertical or stem portions of the slots 19 for attachment to the keys by means of the fastener elements 21. The connection between the carriers and holder is such as to permit unobstructed radial sliding movement of the carriers, but at the same time prevent lateral or twisting movements of the carriers relative to the holder.

The outer end portions of the carriers 17 are provided with recesses 22 therein within which the jaw sections 12 are located. As shown, a jaw section 12 is located upon each carrier and these jaw sections are removably secured to the vertical walls of the recesses 22 in the carriers by means of fastener elements 23 having the head portions thereof located within recesses 24 in the jaw sections. Radial inward movement of the carriers and accordingly jaw sections 12 is restricted by means of a disk 25 countersunk within the under surface of the holder 16 concentric with the vertical axis of the latter for engagement with the inner ends of the keys and carriers 17. The diameter of the disk 25 is determined with respect to the internal diameter of the rim members to be fashioned so as to provide for positioning the jaw sections 12 within the circumference of the rim members upon lowering the assembly 10. The jaw carriers are normally yieldably maintained in their innermost position in engagement with the stop 25 by means of suitable coil springs 26. As shown particularly in Figure 1, a spring 26 is provided for each carrier 17 and these springs surround suitable shafts 27 having the inner ends fixed to the outer ends of the carriers 17 and having the outer ends thereof slidably engaging suitable brackets 29 carried by the holder as at 30. The springs 26 are arranged under compression between the brackets and outer ends of the carriers so as to automatically return the same from their outermost positions into engagement with the stop 25.

The lower assembly 11 is similar in many respects to the upper assembly 10 hereinbefore described in that it is provided with a holder 35 having radially extending T-shaped grooves 36 in the upper surface thereof for slidably receiving the keys 38. The keys 38 are slidably mounted within the transverse portions of the slots 36 and are provided at the outer ends thereof with depending projections 39 adapted to engage suitable shoulders 40 on the holder 35 so as to limit radial inward movement of the keys relative to the latter holder.

The lower assembly is also provided with a plurality of jaw carriers 41 slidably mounted upon the upper surface of the holder and having longitudinally extending depending projections 42 adapted to extend into the vertical portions of the T-shaped slots for attachment to the keys 38 by the fastener elements 43. The arrangement is such as to provide for sliding movement of the carriers as a unit with the keys. The jaw carriers 41 are similar in design to the jaw carriers 17 in that they are recessed at the outer ends thereof for receiving the jaw sections 13. A jaw section 13 is detachably secured by means of the fastener elements 45 to each carrier 41 and the number of carriers and jaw sections in the lower jaw assembly corresponds exactly to the number of jaw sections and carriers in the upper assembly. Both sets of jaw carriers 17 and 41 as well as the jaw sections 12 and 13 respectively carried thereby, are accurately arranged with respect to each other so that when they are in their innermost positions radially of the holder, they will register with each other. In other words, the arrangement is such that when the upper assembly 10 is moved downwardly relative to the lower assembly 11, the upper jaw sections 12 engage the lower jaw sections 13 and cooperate therewith to form jaws with cross sectional area simulating the cross sectional area of a drop center rim.

The lower jaw carriers 41 are normally maintained in their innermost positions for registration with the upper jaw carriers 17 by means of suitable springs 46 arranged under tension between the outer ends of the carriers 41 and a fixed part of the holder 35. In detail, brackets 47 are secured to the holder 35 and are provided at the outer ends thereof with upwardly extending arms 48 spaced radially outwardly from the outer ends of the carriers 41. The arms 48 are apertured as at 49 for slidably receiving the rods 50 having the inner ends thereof secured to the outer ends of the slides 41. The springs 46 encircle the rods 50 and have the opposite ends thereof engaging the arms 48 and die carriers 41 respectively for yieldably urging the projections 39 on the latter into engagement with the shoulders 50 on the holder.

The lower jaw assembly is positioned above a stationary base 51 and the holder 35 is centrally apertured as at 54 for receiving the expanding cone 14 which is rigidly secured to the base 51. The expanding cone extends upwardly through the opening 54 with the tapered walls 15 thereof opposite the inner walls of the carriers 41 which are correspondingly tapered so that upon downward movement of the lower assembly 11 relative to the base, the walls 15 will engage each of the jaw carriers 41 and move the same together with the jaw sections 13 radially outwardly against the action of the springs 46.

In order to permit downward movement of the lower jaw assembly 11 relative to the expanding cone 14, I provide a resilient support for the holder 35. While various types of supports may be employed for this purpose, nevertheless, I have shown the same as comprising an air cushion 55 in the form of a cylinder 56 having a piston 57 reciprocably mounted therein. The piston functions to compress the air in the cylinder upon downward movement of the lower assembly 11 and is operatively connected to the latter by a plurality of rods 58 having the lower ends connected to the piston 57 and having the upper ends extending through openings in the base and abutting the bottom surface of the holder 35. The pressure in the cylinder normally acting upon the lower side of the piston tending to urge the same into engagement with the upper wall of the cylinder is sufficient to normally maintain the holder in its uppermost position shown in Figure 1. This pressure, however, is considerably less than the pressure exerted upon the opposite side of the lower assembly by the upper assembly with the result that as the upper assembly continues to move downwardly after engaging the lower assembly, the latter will be moved downwardly therewith as a unit and in so doing causes the piston to compress the air in the cylinder 56. The arrangement is such as to provide sufficient downward movement of the assemblies as a unit to permit the desired radial travel of the sizing jaws. In order to accurately guide the lower jaw assembly during movement thereof relative to the expanding cone, suitable pins 59 are provided on the holder 35 having portions slidably engaging in bushings 60 sleeved within openings in the base 51.

Referring now to the operation of the expanding fixture hereinbefore described and assuming that the parts thereof are in the positions shown in Figure 1 and that it is desired to size a drop center rim, the latter is merely positioned upon the jaw sections 13 of the lower assembly 11 in the manner illustrated. The upper assembly is then moved downwardly relative to the lower assembly until the jaw carriers 17 and jaw sections 12 thereon extend into the rim and engage the corresponding parts of the lower assembly whereupon completed sizing jaws are formed within the circumference of the rim. Continued downward movement of the upper assembly effects a corresponding downward movement of the lower assembly relative to the expander 14 and as a consequence, causes the tapered walls 15 on the latter to engage the correspondingly tapered inner walls of the carriers 14 and 17 to move the latter as a unit radially outwardly. Inasmuch as the jaws formed by the sections 12 and 13 are fixed to the carriers in the manner previously stated, it will be apparent that these jaws will be moved radially outwardly with the carriers into engagement with the rim.

The length of the tapered walls 15 on the expander is such as to engage both groups of upper and lower carriers prior to downward movement thereof as a unit relative to the expander which, under ordinary conditions, would effect unitary radial travel of the jaw sections 12 and 13 outwardly. However, in order to insure simultaneous radial travel of the jaw sections 12 and 13, I provide lugs 61 on the upper surfaces of each of the lower carriers 41 engageable within recesses 62 formed in the adjacent surfaces of each of the upper carriers 17 when the latter are engaged with the former.

As soon as the expanding operation has been completed, the upper jaw assembly is moved upwardly to its initial starting position shown in Figure 1 and the carriers 17 together with the die sections 12 are moved to their innermost or inoperative positions under the influence of the springs 26. Upward movement of the assembly 10 relative to the assembly 11 immediately relieves the pressure on the latter and thereby permits the air in the cylinder 56 to expand. Expansion of the air in the cylinder 56 obviously causes an upward movement of the piston in the cylinder, and since the lower jaw assembly is supported upon the piston through the rods 58, this assembly will also be moved upwardly to its initial position. As the lower assembly 11 is moved upwardly in the manner specified, the springs 46 serve to move the jaw sections 13 radially inwardly to release the rim.

From the foregoing, it will be observed that by forming the jaws of cooperating separable sections mounted for relative movement toward each other to positions within the circumference of the rims from opposite sides thereof, the extent of radial travel of the jaws may be restricted to substantially the degree of expansion of the rim members since practically no allowances need be made for the differences between the internal and external diameters of the rims in determining the length of radial travel of the jaws. In other words, the above described construction provides for minimizing the extent of radial travel of the jaws in rim expanding apparatus and consequently provides for engaging the rims substantially throughout the circumference of the latter by the expanding jaws.

What I claim as my invention is:

1. Apparatus for expanding vehicle wheel rim members comprising a pair of spaced holders mounted for relative movement toward and away from each other, a plurality of jaw sections mounted for radial sliding movement on each holder and cooperating with each other in one relative position of the holders to form sizing jaws, means for relatively moving the holders in both the aforesaid directions, and common means for moving the cooperating jaw sections as a unit radially of the holders in timed relation to relative movement of the latter toward each other.

2. Apparatus for expanding vehicle wheel rim members comprising a pair of spaced holders mounted for relative movement in a predetermined path toward and away from each other, a plurality of jaw sections slidably mounted upon each holder for movement in a direction transverse to the path of travel of said holders and cooperating with each other in one relative position of the holders to form sizing jaws, means for relatively moving said holders in both the aforesaid directions, and an expander engageable with the cooperating jaw sections for moving said sections as a unit relative to their respective holders in the direction of movement aforesaid thereof.

3. Apparatus for expanding vehicle wheel rim members comprising a pair of spaced holders mounted for relative movement toward and away from each other along an axis common to both holders, a plurality of corresponding jaw sections mounted upon each holder for sliding movement radially of the axis aforesaid and cooperating with each other in one relative position of the holders to form sizing jaws, means for relatively moving said holders, means interconnecting said sections when the latter are in cooperative relationship preventing relative radial travel thereof, and means operable in dependence upon relative movement of the holders for moving said sections as a unit radially outwardly from said axis.

4. Apparatus for expanding vehicle wheel rim members comprising, a pair of spaced holders mounted for reciprocation toward and away from each other along an axis common to both holders, a plurality of corresponding jaw sections mounted upon each holder for sliding movement radially of the axis aforesaid and fashioned to cooperate with each other in one relative position of the holders to form sizing jaws, means for moving one of said holders toward the other to engage the jaw sections thereon with the jaw sections on the other holder and thereafter to cause movement of both holders as a unit, and means operable during the interval both holders are moved as a unit for moving the sizing jaws formed by said sections radially outwardly from the axis aforesaid.

5. Apparatus for expanding vehicle wheel rim members comprising, a pair of spaced holders mounted for reciprocation toward and away from each other along a common axis, a plurality of corresponding jaw sections mounted upon each holder for sliding movement radially of the aforesaid axis and fashioned to cooperate with each other in the innermost positions thereof relative to said axis to form sizing jaws when the holders are moved to their extreme relative positions toward each other, yieldable means normally urging said sections to their innermost positions aforesaid, means for moving one of the holders toward the other to engage the jaw sections thereon with the corresponding jaw sections on the other and thereafter to effect movement of both holders as a unit, means interconnecting the corresponding jaw sections upon engagement thereof preventing relative radial movement of the same, and means fixed relative to the holders for moving the sizing jaws formed by said sections radially outwardly against the action of said yieldable means.

6. Apparatus for expanding vehicle wheel rims comprising, a holder mounted for reciprocation along a fixed axis, a jaw section mounted upon the holder for sliding movement radially of said axis, a second holder positioned to one side of the holder aforesaid in spaced relation thereto, a yieldable mounting for said second holder permitting limited reciprocation of the latter relative to the first holder along said axis, a second jaw section registrable with the jaw section aforesaid and mounted for sliding movement upon said second holder radially of said axis, means for moving the first named holder toward the second holder to engage the jaw sections with each other and thereafter to move both holders as a unit against the action of the yieldable mounting, and means operable during the interval both holders are moved as a unit to simultaneously move said jaw sections radially outwardly relative to the axis aforesaid.

7. Expanding apparatus for rim members comprising sizing jaws formed of cooperating separable jaw sections mounted for radial movement as a unit relative to a common axis and mounted for relative movement toward and away from each other, means for relatively moving the jaw sections away from each other to provide for inserting a rim member therebetween and for subsequently relatively moving the sections toward each other into cooperative relationship within the rim member, and a single expander for moving the sections as a unit radially outwardly into engagement with the rim member.

8. Expanding apparatus for rim members comprising a series of sizing jaw sections insertable into the rim member from one side thereof and forming a support for the rim member, another series of jaw sections insertable into the rim member from the opposite side thereof and cooperating with the jaw sections aforesaid to form sizing jaws, and means for moving the jaws formed by said sections radially outwardly to size the rim member.

9. Expanding apparatus for rim members having portions of different diameter, comprising a series of radially movable jaw sections insertable into the rim member from one side of the latter in the innermost positions thereof and cooperating with each other in the latter positions to form a substantially continuous circumferentially extending surface having a maximum diameter greater than the minimum diameter of the rim member, another series of jaw sections insertable into the rim member from the opposite side thereof and cooperating with the sections aforesaid to form expanding jaws in the rim member, and means for moving said expanding jaws radially outwardly to size the rim member.

10. Expanding apparatus for rim members having opposite side portions of greater diameter than the central portion thereof and integrally connected to the latter portion, comprising a series of radially movable jaw sections insertable into the rim member from one side of the latter when in their innermost positions and cooperating with each other in the latter positions to form a substantially continuous circumferentially extending surface having a maximum diameter greater than the minimum diameter of the rim member, another series of jaw sections insertable into the rim member from the opposite side of the latter when in their innermost positions and also cooperating with each other in the latter positions to form a substantially continuous circumferentially extending surface having a maximum diameter greater than the minimum diameter of the rim member and cooperating with the surface aforesaid of the first named series of jaw sections to form a continuous transverse face corresponding in contour to the cross sectional contour of the rim member, and means for moving the jaw sections as a unit radially outwardly to expand the rim member.

11. Expanding apparatus for rim members comprising a series of jaw sections insertable into the rim member from one side thereof, a second series of cooperating jaw sections insertable into the rim member through the opposite side thereof and cooperating with the jaw sections aforesaid to form sizing jaws, means for relatively moving the sections toward and away from each other axially of the rim member, means operable upon movement of the sections toward each other to interconnect one series of sections with the cooperating series of sections, and means for moving the sections radially outwardly as a unit to expand the rim.

12. Apparatus for expanding vehicle wheel rim members comprising, an expander, a series of jaw sections concentrically arranged with respect to the expander and insertable into a rim member from one side thereof, another series of jaw sections insertable into the rim member from the opposite side thereof and cooperating with the jaw sections aforesaid to form sizing jaws in the rim member, and means for relatively moving the expander and jaw sections in an axial direction to move the jaws formed by said sections radially outwardly into engagement with the rim member.

HARRY A. PALMER.